(12) United States Patent
Spector et al.

(10) Patent No.: US 10,642,577 B2
(45) Date of Patent: *May 5, 2020

(54) SEARCH AND KNOWLEDGE BASE QUESTION ANSWERING FOR A VOICE USER INTERFACE

(71) Applicant: Amazon Technologies, Inc., Seattle, WA (US)

(72) Inventors: Daniel Lewis Spector, Brookline, MA (US); Fergus O'Donoghue, Brookline, MA (US); Chase Wesley Brown, Jr., Boston, MA (US); Shayne Leon Snow, Tyngsboro, MA (US); Brandon Gerald Li Horst, Arlington, MA (US); William Folwell Barton, Concord, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,741

(22) Filed: Jun. 18, 2019

(65) Prior Publication Data

US 2019/0369957 A1    Dec. 5, 2019

Related U.S. Application Data

(63) Continuation of application No. 15/707,496, filed on Sep. 18, 2017, now Pat. No. 10,331,402.

(Continued)

(51) Int. Cl.
*G10L 15/00* (2013.01)
*G06F 3/16* (2006.01)
(Continued)

(52) U.S. Cl.
CPC .......... *G06F 3/167* (2013.01); *G06F 16/3329* (2019.01); *G06F 16/951* (2019.01);
(Continued)

(58) Field of Classification Search
CPC .. G06F 17/2785; G06F 17/279; G06F 17/274; G06F 17/30654; G06F 17/2705;
(Continued)

(56) References Cited

U.S. PATENT DOCUMENTS 7,203,635 B2 * 4/2007 Oliver .................. G06K 9/6293
345/156
7,778,831 B2 * 8/2010 Chen ..................... G10L 15/065
704/207

(Continued)

*Primary Examiner* — Edgar X Guerra-Erazo
(74) *Attorney, Agent, or Firm* — Pierce Atwood LLP

(57) ABSTRACT

A voice-controlled question answering system that is capable of answering questions using both a knowledge base and a search engine. The knowledge base is used to answer questions when answers to those questions are contained in the knowledge base. If an answer using the knowledge base is unavailable, and if the question is suitable for answering using an unstructured search approach, the system may obtain an answer using a search engine. The search engine results may be processed to obtain an answer to the question suitable for output using a voice user interface.

20 Claims, 10 Drawing Sheets

Related U.S. Application Data

(60) Provisional application No. 62/512,359, filed on May 30, 2017.

(51) Int. Cl.
*G10L 15/18* (2013.01)
*G10L 15/26* (2006.01)
*G06F 16/951* (2019.01)
*G06F 16/332* (2019.01)

(52) U.S. Cl.
CPC ........ *G10L 15/1815* (2013.01); *G10L 15/265* (2013.01); *G10L 15/26* (2013.01)

(58) Field of Classification Search
CPC ........ G06F 17/30401; G06F 17/30445; G06F 17/30598; G06F 17/30684; G06F 17/30705; G06F 17/30976; G06F 17/30516; G06F 17/30554; G06F 17/30693; G06F 17/30699; G06F 17/30867; G06Q 50/01; G10L 15/1822; G10L 17/005; G10L 19/22; G10L 2015/0631; G10L 21/028
See application file for complete search history.

(56) References Cited

U.S. PATENT DOCUMENTS

| | | | |
|---|---|---|---|
| 8,010,358 B2* | 8/2011 | Chen | G10L 15/32 704/207 |
| 8,429,106 B2* | 4/2013 | Downs | G06F 17/2745 706/21 |
| 8,756,057 B2* | 6/2014 | Miller | G09B 21/009 704/235 |
| 9,128,896 B2* | 9/2015 | Mason | G06Q 10/00 |
| 9,135,344 B2* | 9/2015 | Mason | G06F 16/9535 |
| 9,269,374 B1* | 2/2016 | Conway | G06K 9/00302 |
| 10,331,402 B1* | 6/2019 | Spector | G06F 3/167 |
| 2003/0154072 A1* | 8/2003 | Young | H04M 3/51 704/9 |
| 2004/0030750 A1* | 2/2004 | Moore | H04L 12/14 709/204 |
| 2006/0122840 A1* | 6/2006 | Anderson | G10L 13/033 704/275 |
| 2008/0189096 A1* | 8/2008 | Apte | G06F 9/454 704/2 |
| 2009/0100050 A1* | 4/2009 | Erol | G06K 9/00463 |
| 2012/0330934 A1* | 12/2012 | Duboue | G06F 16/334 707/722 |
| 2013/0159233 A1* | 6/2013 | Mason | G06N 5/00 706/45 |
| 2013/0241952 A1* | 9/2013 | Richman | G06F 17/21 345/619 |
| 2015/0019216 A1* | 1/2015 | Singh | G10L 15/183 704/235 |
| 2015/0234636 A1* | 8/2015 | Barnes, Jr. | G06Q 10/1053 715/728 |
| 2016/0217472 A1* | 7/2016 | Podgorny | G06Q 30/016 |

* cited by examiner

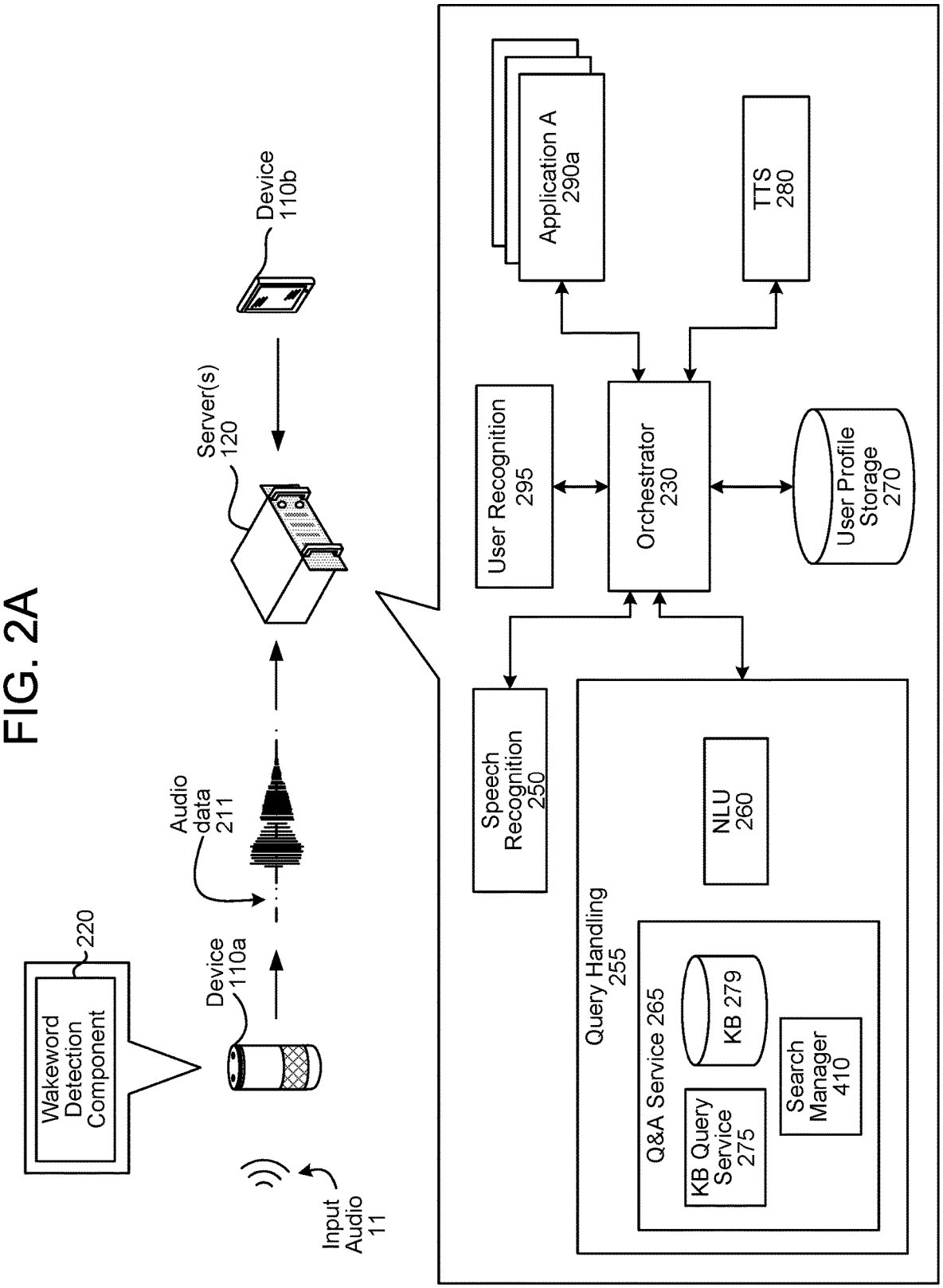

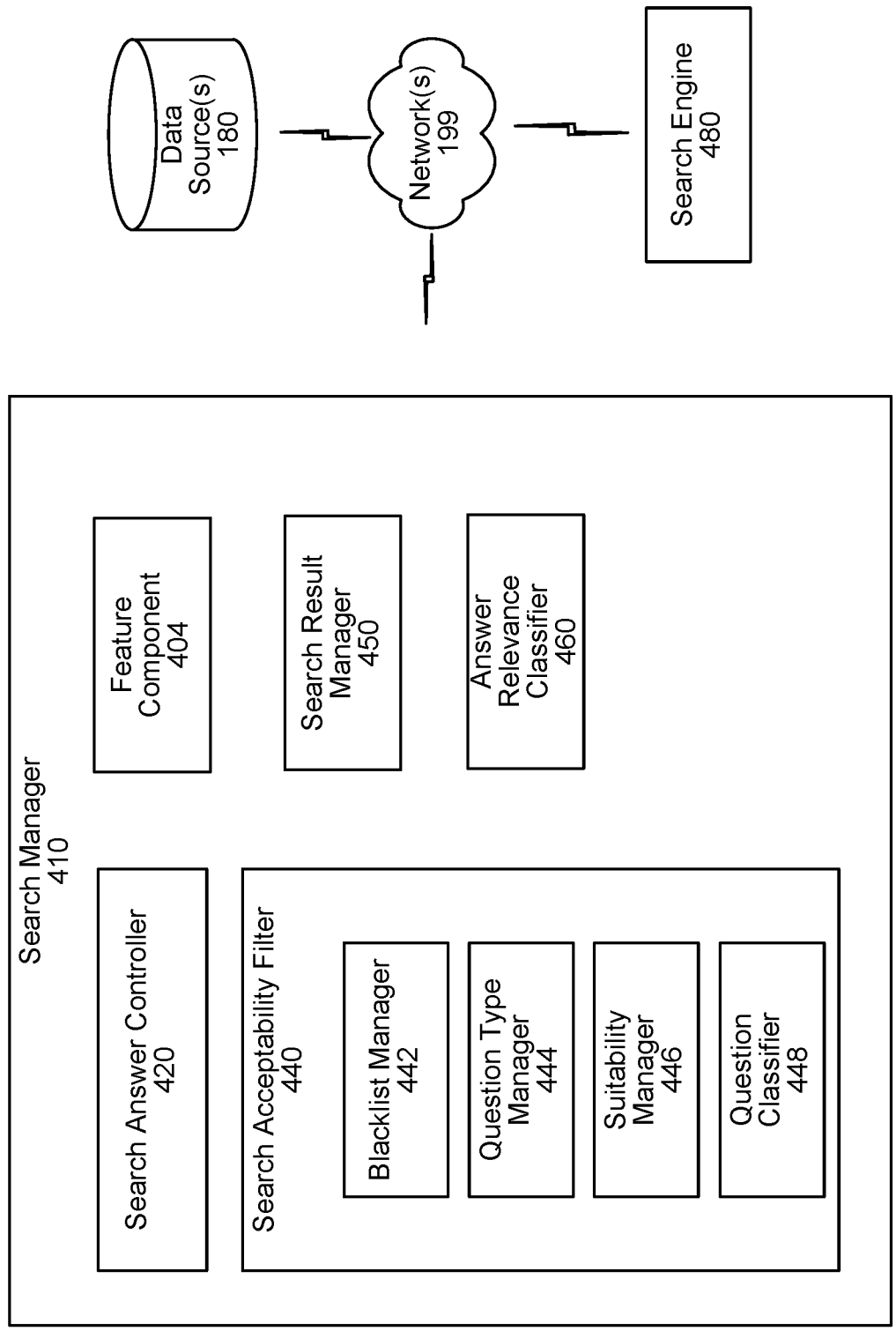

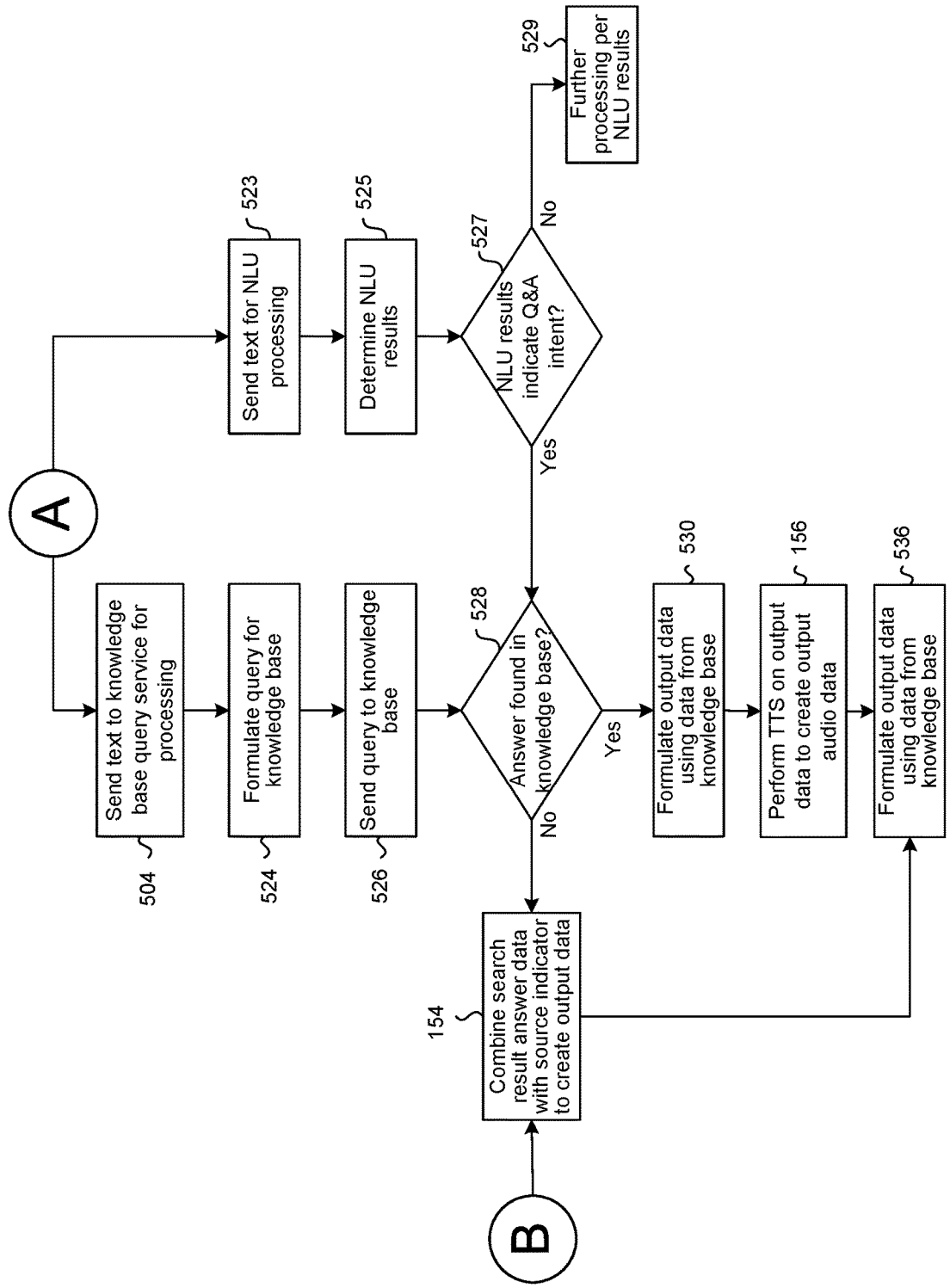

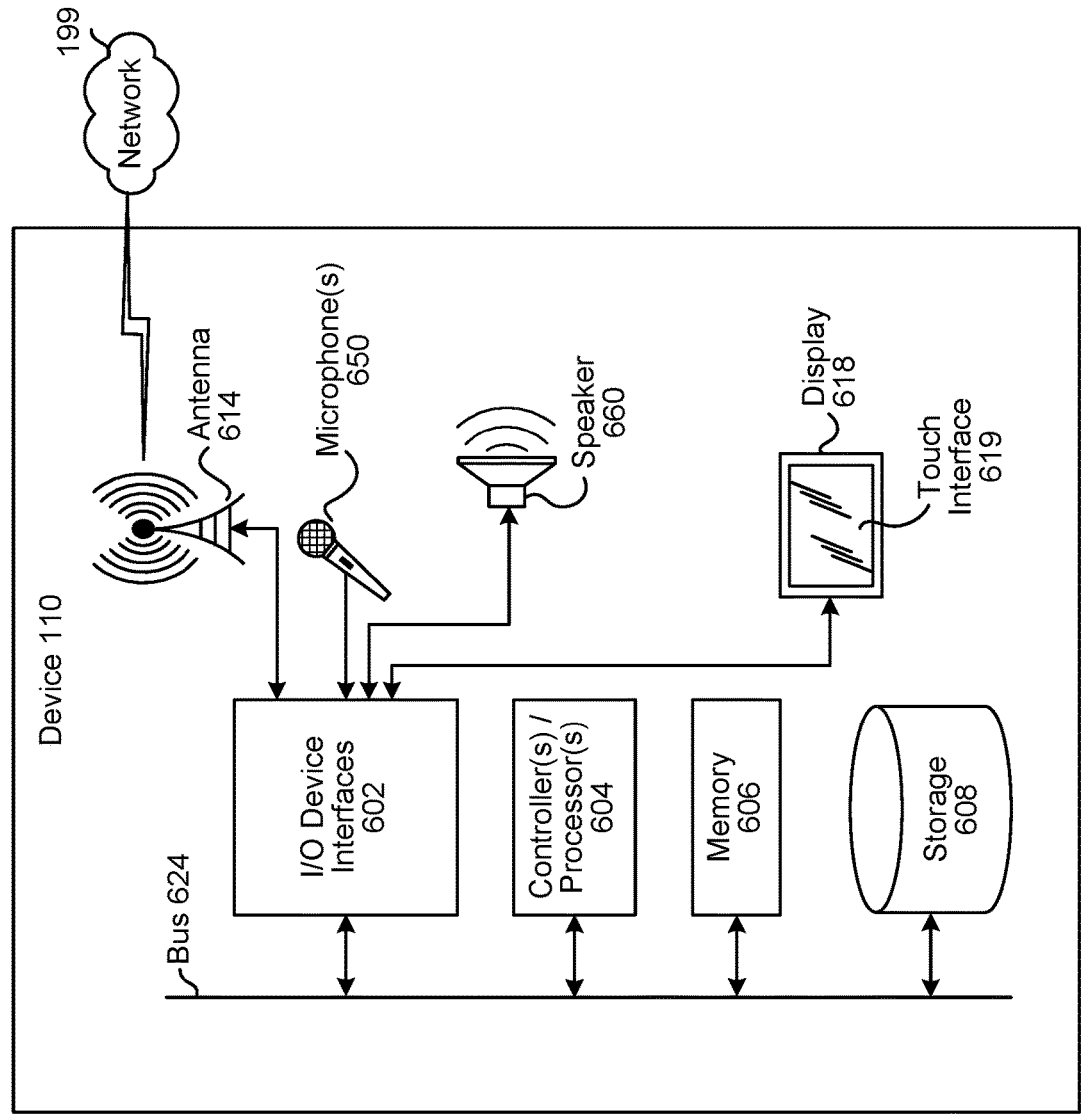

SEARCH AND KNOWLEDGE BASE QUESTION ANSWERING FOR A VOICE USER INTERFACE

CROSS REFERENCE TO RELATED APPLICATION

This application is a continuation of, and claims the benefit of priority of, U.S. Non-provisional patent application Ser. No. 15/707,496, filed Sep. 18, 2017 and entitled "SEARCH AND KNOWLEDGE BASE QUESTION ANSWERING FOR A VOICE USER INTERFACE," scheduled to issue as U.S. Pat. No. 10,331,402, which claims priority to provisional U.S. Patent Application No. 62/512,359, entitled "SEARCH AND KNOWLEDGE BASE QUESTION ANSWERING FOR A VOICE USER INTERFACE" filed on May 30, 2017 in the names of Daniel Lewis Spector, et al. The contents of each of which is expressly incorporated herein by reference in its entirety.

BACKGROUND

Speech recognition systems have progressed to the point where humans can interact with computing devices entirely relying on speech. Such systems employ techniques to identify the words spoken by a human user based on the received audio input. Speech recognition combined with natural language understanding processing techniques enable speech-based user control of a computing device to perform tasks based on the user's spoken commands. Speech recognition may also include converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2A is a diagram of components of a system according to embodiments of the present disclosure.

FIG. 4 illustrates obtaining search-based results for a user query received from a voice user interface according to embodiments of the present disclosure.

FIGS. 5A-5B are a flow chart illustrating search-based question answering according to embodiments of the present disclosure.

FIG. 6 is a block diagram conceptually illustrating example components of a device according to embodiments of the present disclosure.

DETAILED DESCRIPTION

Figure 1:
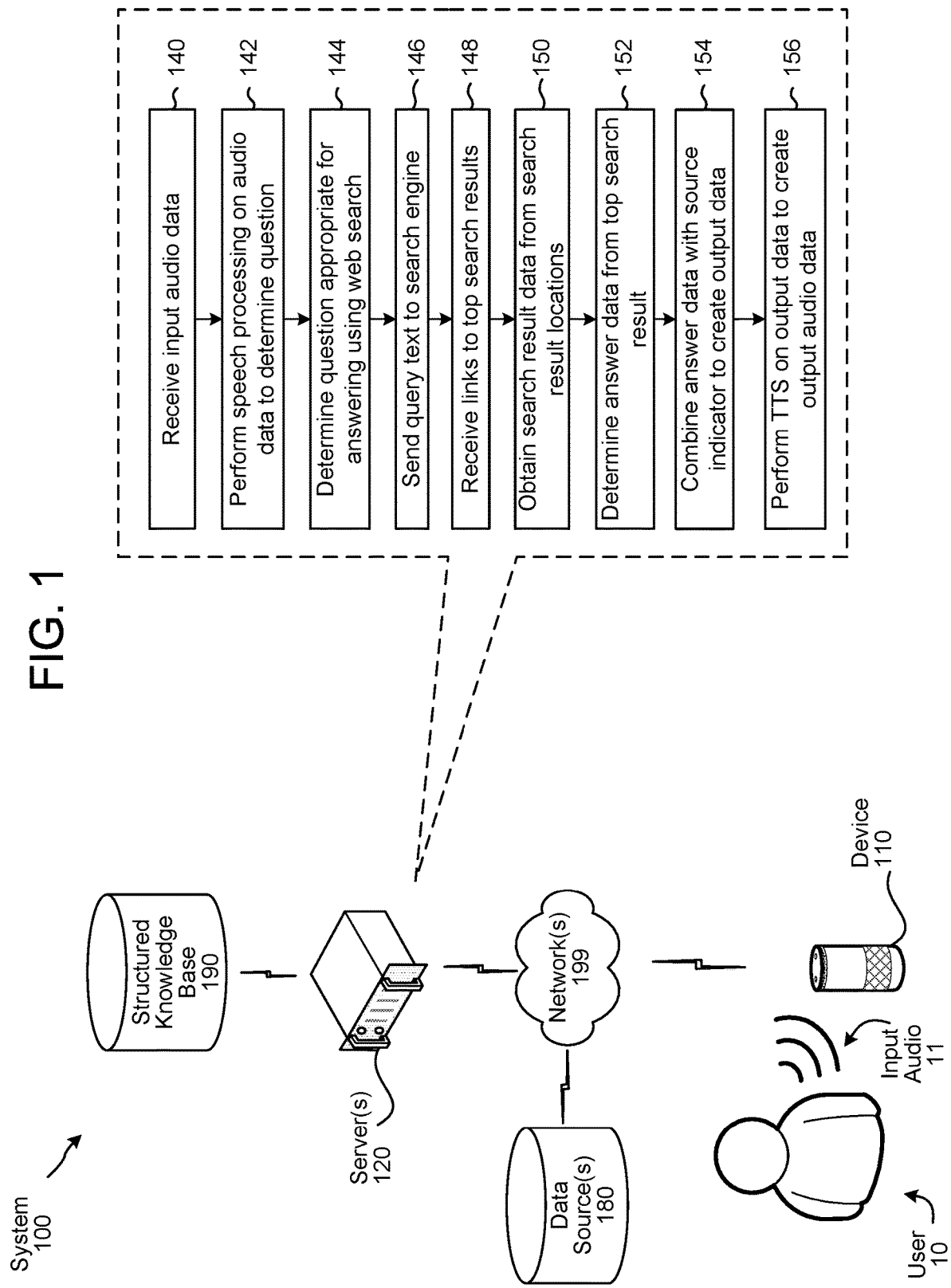
FIG. 1 illustrates a quasi-semantic question answering system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. The combination of ASR and NLU may be referred to herein as speech processing.

ASR and NLU can be computationally expensive. That is, significant computing resources may be needed to process ASR and NLU processing within a reasonable time frame. Because of this, a distributed computing environment may be used when performing speech processing. An example of such a distributed environment may involve a local device having one or more microphones being configured to capture sounds from a user speaking and circuitry configured to convert those sounds into an audio signal. The audio signal/data may then be sent to a downstream remote device for further processing, such as for converting the audio signal into an ultimate command. The command may then be executed by a remote and/or (the) local device(s) depending on the command itself.

In certain situations, a user utterance may include a question to be answered by the system. That is, the user may ask the system to provide some information in response to the utterance. The ultimate command in this example would be to provide the information requested. As part of NLU processing, in order to respond to a user's query, the system may rely on a structured knowledge base to obtain or confirm information requested by the query. A structured knowledge base is a data store that includes facts organized in a particular manner that may be used to respond to user queries.

In one example, a knowledge base may include a collection of tuples and may encode formal semantics on the data stored within the knowledge base. In such a knowledge base certain knowledge bases or information stores may store information in a "tuple" format, where entities are joined together in pairs, triplets, or the like, that define the relationship between two things. For example a tuple such as [John Doe, husband of, Jane Doe] may describe that John Doe is Jane Doe's husband. Many such tuples may exist in a knowledge base and may be usable to answer incoming informational queries. For example, the above tuple may be used to answer a question such as "who is Jane Doe's husband," "who is John Doe married to" or the like.

One drawback to a tuple-based approach, or other knowledge base that may store information in a limited format, is that it may be difficult for the system to infer knowledge between different tuples. For example, if other tuples existed such as [John Doe, date of marriage, 2002] and [Jake Doe, brother of, John Doe], a tuple-based system may not be able to answer a question such as "when did John Doe become the brother-in-law of Jane Doe" as the system would need to traverse and link several tuples regarding the various relationships and dates to obtain the needed information. Such processing would be difficult for a tuple based system.

In another structured knowledge base information may be stored in a form representative of a knowledge graph, which may comprise a directed acyclic graph (DAG) which graphs nodes representing entities (e.g., people, places, things) connected by vertices or links where each link corresponds to a relationship. To answer questions about particular entities in a knowledge graph, the system may traverse a path along the knowledge graph from one entity to another and track the information along the traversed links to obtain information about how one entity relates to another. For example, a DAG may include a node for Jane Doe, a node for John Doe, a node for Jake Doe, etc. A link between Jane Doe and John Doe may be associated with a variety of information such as "married in 2002," "met in 2000," etc. A link between John Doe and Jake Doe may be associated with information such as "brothers" or the like. Even if there is no direct link between the node for Jane Doe and the node for Jake Doe, the system may be able to determine a path between the two, and gather information along the vertices along that path (e.g., from Jane Doe to John Doe and then from John Doe to Jake Doe) to obtain information needed to answer the query "when did John Doe become the brother-in-law of Jane Doe."

The knowledge base may also include a schema (for example defined by classes and properties) to organize its data.

There are many types of queries that a user may pose from simple single-fact questions (for example, "what is the capital of France?") to more detailed questions involving time, place, multiple entities, etc. (for example, "when was Tom Cruise married to Nicole Kidman?"). Query resolution systems may rely on a rule/template based approach. In such an approach, a series of rules may be used to analyze the incoming text data of the query to identify the intent of the query (i.e., what information is being sought) and what entities are named in the query that are needed to provide the desired information. In a rule/template based approach, rules may be applied to text data, where the results of each rule's processing may be given a confidence score where the rule results corresponding to a highest confidence score are selected, parsed and passed on to the knowledge base.

In order to retrieve answer data from a knowledge base, a query may first be parsed and new data generated in a form recognizable by the knowledge base. That data may then be sent to the knowledge base to obtain information responsive to a user query. That responsive information may then be formatted as output data to be returned to a user, either as synthesized speech to speak the answer to the user or in some other form (such as email, text message, visual display user element, etc.).

One benefit to a structured knowledge base is that such a knowledge base may result from some level of curation and/or compilation such that the information in the structured knowledge base may have a higher level of reliability and otherwise may generally be more accurate that information that may otherwise be available. Further, it may be desirable to use a knowledge base to answer questions for a voice user interface (VUI) where typically only one answer may be returned to a user as opposed to for a graphical user interface (GUI) where multiple potential answer may be displayed to a user, allowing the user to select which answer most closely corresponds to the information the user was seeking.

One drawback to using a knowledge base is that not all questions will be answerable using the knowledge base, either because the knowledge base does not include sufficient information to answer the question, or because the query may be phrased in a way that makes it difficult for natural language components to understand what information the user is requesting. Specifically, in order to form a query to the knowledge base the system may perform NLU processing to make a sematic understanding of the question and the information being sought, so the system can formulate the query to the knowledge base to obtain the desired question. Enabling a computing system to undertake a semantic understanding of every potential question would be technically challenging.

An alternative to a knowledge base query is a web query, where a search string is input into a search engine. However the result for such web queries often take the form of a list of Internet links rather than an answer to a specific question, and further web queries make no effort at any semantic understanding, relying instead on a solely keyword based search approach. Further, as noted above such general search queries often obtain multiple potential responsive results, but a VUI may only be able to return a single result.

Offered is a question answering system that incorporates a knowledge base but also allows the ability to use a web search to obtain results for a spoken query, particularly if the knowledge base is unable to provide an answer. A variety of components operate to ensure that a question is appropriate for obtaining an answer using a web search as well as to ensure that a search result is appropriate for ultimately returning to a user. The system can process search results to obtain a top sentence or two (or other portion of text) corresponding to an answer to the user's query, which may ultimately be returned through a VUI.

This combined approach of answering questions allows the system to answer both questions that call for information in, and are parse-able into a form understood by, a knowledge base (for example "what is the capital of France?" or "who was the first President of the United States?") as well as more complex questions that are difficult to parse or whose answers may not be in a knowledge base but may be found on the Internet or in other sources (for example "how many black keys are there in a piano?" or "who was the American music promoter who brought the Beatles to play in Shea Stadium?").

FIG. 1 shows a system 100 configured to use a quasi-search based approach to question answering. Although FIG. 1, and further figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, question parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, at runtime a user 10 may speak an utterance (represented by input audio 11) including a question to a local device 110. The device 110 may convert the audio 11 into audio data 111 and send the audio data to the server(s) 120. The server(s) 120 may then receive (140) the input audio data and perform (142) speech processing on the audio data to obtain text (through ASR processing) and/or NLU results that determine the utterance included a question. The server(s) 120 may then determine (144) whether the question is appropriate for a web-search answering approach using one or more components as explained below. For example, the system may use one or more trained machine learning models to determine whether the question is appropriate. The system may then send (146) portions of the question that include the text of the user's query to a search engine for processing. The system may then receive (148) search results from the search engine. The search results may include links, such as uniform resource locators (URLs) or other pointers to data source(s) 180 that may include information responsive to the query. The system may access and obtain (150) search result data pointed to by the links and process the data from the data source(s) 180 that are potentially responsive to the user's question. The system may then determine a sentence or other portion of data from the search result data to determine (152) answer data from the top search result. The system may then combine (154) the answer data with a source indicator (such as text indicating what website or other data source(s) the answer data was obtained from). The system may then perform (156) TTS on output data to create output audio data speaking the answer obtained from the web search along with an indicator of the source of the answer. For example, the system may respond to the user's query with synthesized speech such as "I found an answer to your question. According to [website X]: [answer data]." As explained below, the system may also attempt to answer the user's query using a structured knowledge base 190 and may select from answer data obtained from the structured knowledge base 190 or from the search process described herein.

The system may operate using various components as described in FIG. 2A. The various components illustrated FIG. 2A may be located on a same or different physical devices. Communication between various components illustrated in FIG. 2A may occur directly or across a network(s) 199.

An audio capture component, such as a microphone or array of microphones of the device 110*a* or other device, captures the input audio 11 corresponding to a spoken utterance. The device 110*a*, using a wakeword detection component 220, processes audio data corresponding to the input audio 11 to determine if a keyword (e.g., a wakeword) is detected in the audio data. Following detection of a wakeword, the device 110*a* sends audio data 211, corresponding to the utterance, to a server(s) 120 for processing.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component. A speech recognition component 250 (which may be part of the speech processing component) transcribes the audio data 211 into one or more textual interpretations representing speech contained in the audio data 211. The speech recognition component 250 interprets the spoken utterance based on a similarity between the spoken utterance and pre-established language models. For example, the speech recognition component 250 may compare the audio data 211 with models for sounds (e.g., subword units or phonemes) and sequences of sounds to identify words that match the sequence of sounds spoken in the utterance represented in the audio data 211.

Alternatively, a keyboard (e.g., presented on a touch sensitive display) of a device 110*b* may capture textual input corresponding to a user command. The device 110*b* may generate text data corresponding to the input text, and may send the text data to the server(s) 120. Upon receive by the server(s) 120, the text data may be sent to the orchestrator component 230.

If the user command was received by the server(s) 120 as audio data from the device 110*a*, the speech recognition component 250 sends text data generated using speech recognition processing to the orchestrator, which then sends the text data to the query handling component 255. The text data sent from the speech recognition component 250 may include a top scoring textual interpretation of the spoken utterance or may include an N-best list including a group of textual interpretations and potentially their respective scores.

The orchestrator component 230 sends the text data (either generated by the ASR component 250 or otherwise) to a query handling component 255. The query handling component may attempt to process the text data corresponding to a user query in a number of ways. Those ways may be executed at least partially in parallel. The text data may be sent to question and answer (Q&A) service component 265 which may attempt to process the text data, where the Q&A service component 265 assumes that the text data corresponds to an information request. As the Q&A service component 265 may operate at least partially in parallel to a natural language understanding (NLU) component 260, the Q&A service component 265 may not know if the text data actually corresponds to an information request, but processing the text data at least partially in parallel between the NLU component 260 and Q&A service component 265 may result in reduced user latency.

The text data may be sent to a knowledge base (KB) query service which may work in conjunction with a structured knowledge base 279 to attempt to obtain information responsive to the text data. As noted above, the KB 279 may include a collection of tuples or otherwise semantically (or otherwise) encoded data that can be queried to obtain information. One example of such a knowledge base is Amazon's EVI knowledge base.

At least partially in parallel to the KB query service 275 attempting to find an answer to the text data using KB 279, the system may operate a search manager 410 to attempt to find an answer to the text data using an unstructured web search, as discussed below.

At least partially in parallel to the operations of the Q&A service component 265, the system may process the text data using the NLU component 260. The NLU component 260 attempts to make a semantic interpretation of the phrases or statements represented in the text data. That is, the NLU component 260 determines one or more meanings associated with the phrases or statements represented in the text data based on individual words represented in the text data. The NLU component 260 interprets a text string to derive an intent of the user command represented in the text data (e.g., an action that the user desires be performed) as well as pertinent pieces of information in the text data that allow a device (e.g., the device 110*a*, the device 110*g*, the server(s) 120, the application server(s) 125, etc.) to complete the intent. For example, if the text data corresponds to "call mom," the NLU component 260 may determine the user intended to activate a telephone in his/her device and to initiate a call with a contact matching the entity "mom."

Following ASR processing, the ASR results may be sent by the AS component 250 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

Figure 2B:
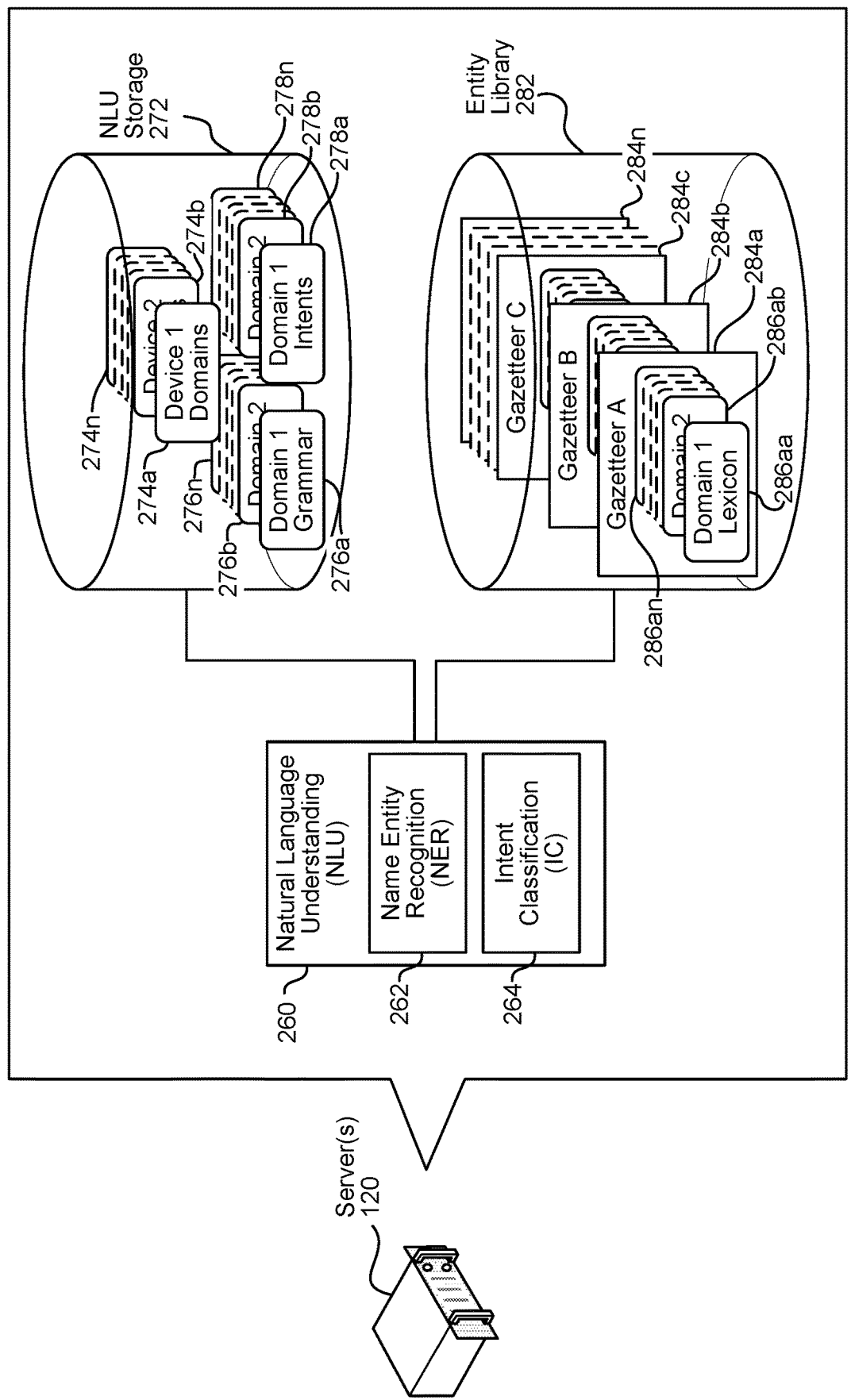
FIG. 2B is a diagram of components of a system for performing natural language understanding according to embodiments of the present disclosure.

The device performing NLU processing 260 (e.g., server 120) may include various components, including potentially dedicated processor(s), memory, storage, etc. For example, as shown in FIG. 2B, a device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The orchestrator component 230 may send output from the NLU component 260 (e.g., text data including tags attributing meaning to the words and phrases represented in the text data), and optionally output from the user recognition component 295 and/or data from the user profile storage 270, to one or more applications 290, which may be located on a same or separate server 120 as part of system 100. FIG. 2A illustrates various applications 290 maintained and/or operated by the server(s) 120. However, it should be appreciated that the data sent to the applications 290 may also be sent to application servers 125 executing applications.

The destination application 290 may be determined based on the NLU output. For example, if the NLU output includes a command to play music, the destination application 290 may be a music playing application, such as one located on device 110 or in a music playing appliance, configured to execute a music playing command.

An "application," as used herein, may be considered synonymous with a skill. A "skill" may correspond to a domain and may be software running on a server(s) 120 that is akin to an application. That is, a skill may enable a server(s) 120 or application server(s) 125 to execute specific functionality in order to provide data or produce some other output requested by a user. The system may be configured with more than one skill. For example a weather service skill may enable the server(s) 120 to execute a command with respect to a weather service server(s) 125, a car service skill may enable the server(s) 120 to execute a command with respect to a taxi or ride sharing service server(s) 125, an order pizza skill may enable the server(s) 120 to execute a command with respect to a restaurant server(s) 125, etc.

The application 290 to which the orchestrator component 230 sends data may be chosen based on the output of the natural language component 260. In an example, if the NLU component 260 outputs text data associated with an intent to play music, the application 290 selected may correspond to a music playing application. In another example, if the NLU component 260 outputs text data associated with an intent to output weather information, the application 290 selected may correspond to a weather application.

The orchestrator component 230 may send text data output by the application 290 to a TTS component 280. The TTS component 280 may synthesize speech corresponding to received text data. Audio data synthesized by the TTS component 280 may be sent to the device 110a (or another device including a speaker) for output to a user.

An application 290 may output text data to the server(s) 120. In certain configurations device 110 is a speech controlled device whose primary input/output is speech, either from the user to provide inputs/queries to the system, or by the system to respond to the user (such as answering a query) in the form of a synthesized speech output. Such spoken interactions may be common, for example, with headless devices that lack a keyboard, touchscreen, or other input/output mechanisms, though speech control may be used with many different device types.

To create output speech audio (for headless devices or otherwise), the system may be configured with a text-to-speech (TTS) component 280. The TTS component 280 may perform speech synthesis using one or more different methods. In one method of synthesis called unit selection, the TTS component 280 matches text data or a derivative thereof against a database of recorded speech. Matching units are selected and concatenated together to form audio data. In another method of synthesis called parametric synthesis, parameters such as frequency, volume, and noise are varied by the TTS component 280 to create an artificial speech waveform output. Parametric synthesis uses a computerized voice generator, sometimes called a vocoder.

The server(s) 120 may include a user recognition component 295. The user recognition component 295 may take as input the audio data 211, the text data received by the server(s) 120 from the device 110*b*, and/or the text data output by the speech recognition component 250. The user recognition component 295 determines scores indicating whether the command represented in the audio data 211 or the text data provided by the device 110*b* originated from particular users. For example, a first score may indicate a likelihood that the command originated from a first user, a second score may indicate a likelihood that the command originated from a second user, etc. The user recognition component 295 also determines an overall confidence regarding the accuracy of user recognition operations. If the user command is received as audio data 211, user recognition may involve comparing speech characteristics in the audio data 211 to stored speech characteristics of users. User recognition may also involve comparing biometric data (e.g., fingerprint data, iris data, etc.) received by the user recognition component 295 to stored biometric data of users. User recognition may further involve comparing image data including a representation of at least a feature of a user with stored image data including representations of features of users. Other types of user recognition processes, including those known in the art, may also or alternatively be used. Output of the user recognition component 295 may be used to inform natural language processing as well as processing performed by applications 290 (as well as applications operated by the application server(s) 125).

The server(s) 120 may include a user profile storage 270. The user profile storage 270 includes data regarding user accounts. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. The user profile storage 270 may include a variety of information related to individual users, accounts, etc. that interact with the system.

A voice-controlled question answering system may make use of all the various components discussed above to receive a question from a user, convert that question to audio data, receive and perform ASR on the audio data to identify text, perform NLU on the text to determine a question in the text, formulate a query to the knowledge base using the text, retrieve an answer from the knowledge base, formulate answer data using the answer, perform TTS on the answer data to create output audio data including the answer, send the output audio data to the local device and play the output audio data back to a user. It is desirable, as discussed above, to implement a search-based question answering approach to supplement the use of the knowledge base to respond to user questions. Such as supplemental approach will expand the overall ability of the system to respond to more obscure user questions that are unanswerable by the knowledge base.

Figure 3:
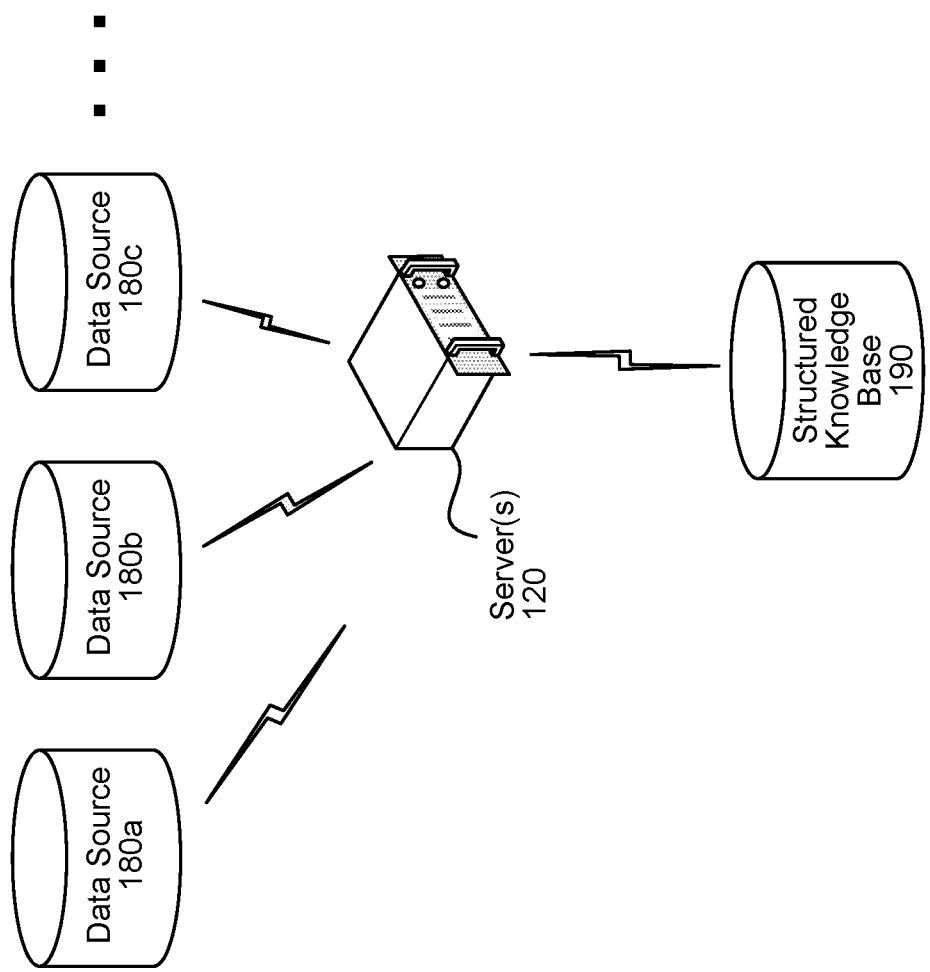
FIG. 3 illustrates obtaining content from a structured knowledge base and other data sources according to embodiments of the present disclosure.

As shown in FIG. 3, the system, through server(s) 120 may obtain information to respond to a user's query from a structured knowledge base 190, and/or from one or more data sources 180. In one example the data sources 180 are available data sources on the internet or other accessible storage source. In another example the data sources 180 are other data sources such as a user's private data source (hard drive, music collection, device configurations, etc.) thus enabling the system to answer queries specific to certain data sources using the techniques described above.

The system may use components such as those illustrated in FIG. 4 to obtain an answer to a user query using a search based system for a voice user interface. As shown the system may include a search manager 410. The search manager 410 may be communicatively connected to a search engine 480 and one or more data source(s) 180. Although illustrated as connected over the network 199, the search manager 410, search engine 480 and one or more data source(s) 180 may be co-located on one or more server(s) 120 or located in various physical arrangements. The search manager 410 may include one or more various sub-components such as search answer controller 420, search acceptability filter 440, search result manager 450 and answer relevance classifier 460.

Figure 5A:
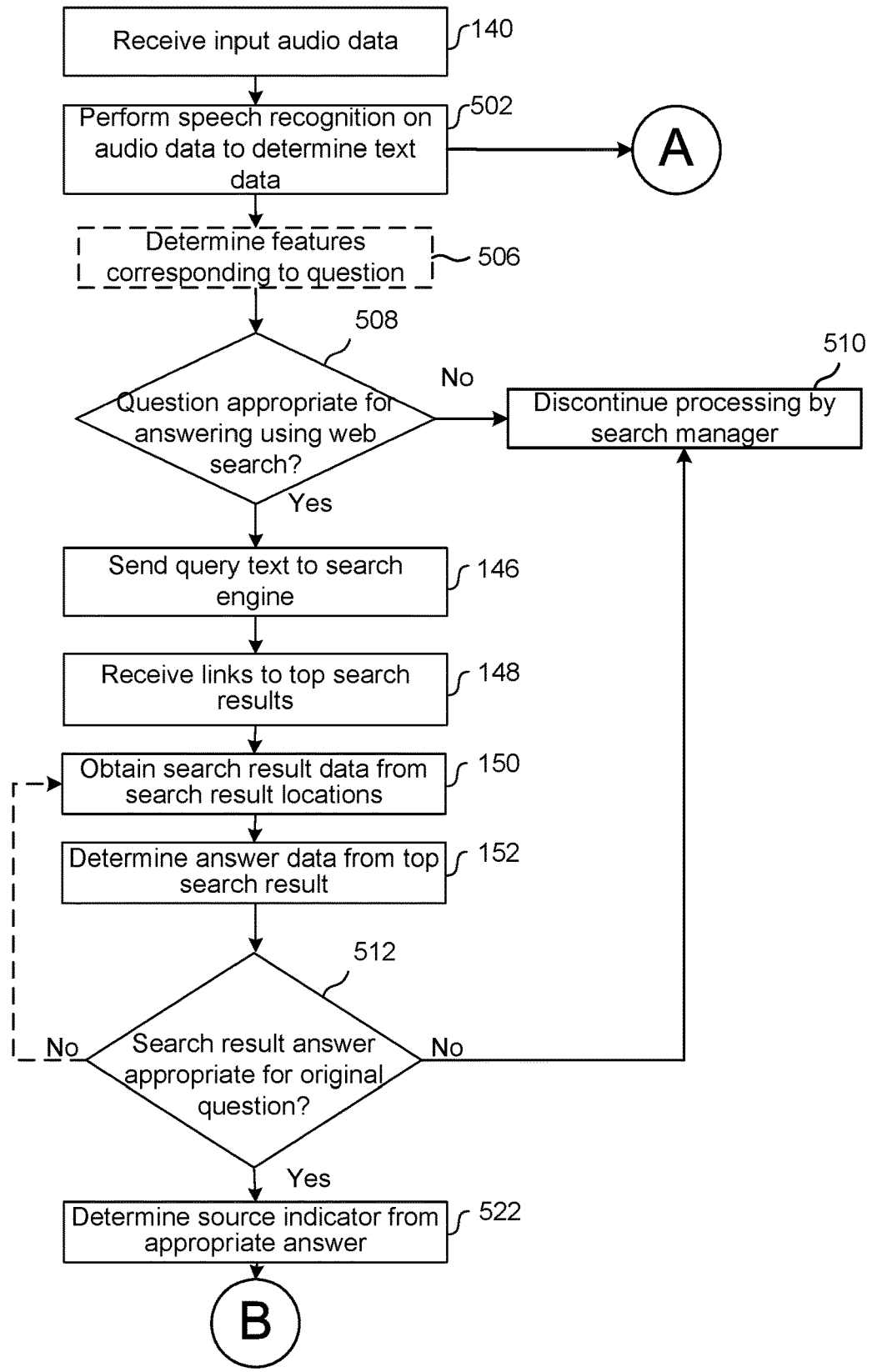

The system may user the components of FIG. 4 to perform a search-based query answering component for a voice controlled system, thus providing an alternate question answering service that may operate at runtime to process user questions to run along with a knowledge-based service. As illustrated in FIG. 5A, a system may receive (140) audio data corresponding to a question. The system may then perform (502) speech recognition on the audio data to obtain the query text data. Alternatively, the system may receive text data from another source, such as a text-based message being received by the system (like from a query interface), text data obtained from an interpretive component such as a component that converts sign language or gesture data into text, or the like. The text data may then be sent to the query handling component 255 for various processing, which may occur serially, in parallel, or at least partially in parallel. For example, turning to FIG. 5B, the text data may be sent (523) to an NLU component 260 for NLU processing and may also be sent (504) to the knowledge base query service 275 for processing to determine if the knowledge base can answer the user's question.

The NLU component 260 may process the text data to determine (525) NLU results which may include an indication of an intent corresponding to the text data. The NLU results may also include indicators of slots, named entities or the like. If the NLU results indicate a Q&A intent (527:Yes) (that is, an intent corresponding to an information request for general knowledge or information), the system may then use the output determined by the Q&A service component(s) 265. If the NLU results do not indicate a Q&A intent (527:No), the system will process (529) the NLU results as otherwise called for by the NLU results.

The left hand side of FIG. 5B includes certain steps taken by the components of the Q&A service component(s) 265. As part of the processing by the knowledge base query service component 275, the system may formulate (524) a query for the knowledge base using the text data and send (526) the query to the knowledge base 279. If the knowledge base 279 can answer the question (528:Yes) the system may formulate (530) output answer data using data from the knowledge base. For a voice user interface system the system may then perform (156) TTS on the output data to obtain output audio data and may send (536) the output audio data to a local device so the local device may output speech corresponding to the answer to the question. If, however, the knowledge base cannot provide an answer to the question (528:No) the system may rely on the search-based question answering approach using the components of FIG. 4 and the process described in FIG. 5A. Alternatively, the knowledge base may attempt to answer the user's question and may even provide an answer with an assigned confidence score. The confidence score of the knowledge base answer may be compared with a confidence score of an answer provided by using the search-based approach (which may occur after such scores are normalized), and the answer with the highest confidence may be used to answer the user's question. Alternatively, if the knowledge base answer does not have a confidence score above a certain threshold, the system may use an answer obtained using the search-based approach.

The alternate question answering approach illustrated further in FIG. 5A may be performed at least partially in parallel (i.e., at least partially at the same time) to querying the knowledge base to reduce latency in the event a knowledge base answer is unavailable (or is not associated with a sufficient confidence score) and may be also be performed at least partially in parallel to the NLU processing by NLU component 260. One difference between querying a knowledge base versus sending query text data to a search engine is that the knowledge base query is typically a structured query configured to align with the operational parameters of the knowledge base whereas a search using a search engine is often unstructured, such that the text data is simply entered into the search engine for the search engine to use when searching the internet (or other source). As certain query text data may not be well suited to an unstructured search using a search engine, as shown in FIG. 5A, the system may determine whether the incoming question is appropriate for the search-based question answering portion of the system. As certain kinds of questions may be more suited to being using a search-based technique (such as questions that omit certain words, questions that are formed as obvious questions, etc.), filtering out less appropriate questions may improve system performance. If a question is not suitable for answering using a web search or other unstructured search (508:No), processing of the text data by the search manager 410 may be discontinued (510) and the text data may be sent or otherwise indicated for alternate processing, which may include alternate techniques beyond the knowledge base and/or web search or may involve simply returning to the user an indication that the system cannot answer the question if the question is unanswerable by the knowledge base.

To determine if the question is appropriate for answering using a web search may train one or more machine learning models which may include a multi-class model, classifier, or multiple classifiers that may return a yes or no (or relative score) to indicate whether the incoming text data will be well handled by the system. The machine learning model(s) used for this stage may be trained on a training set of questions that are labelled either as suitable or not suitable for answering using the search-based system. In particular, the model(s) may be trained to identify questions that may be reliably answered using search-based techniques. As further information becomes available about the operation of the search-based question answering, particularly for a voice user interface (VUI), or as more training data becomes available, the model(s) may be updated/retrained to ensure proper operation of the system. The model(s) may operate on (and be trained on) text data and/or on feature data extracted from the text data. In certain instances, multiple models may be used where each model corresponds to a component of the search manager 410 (such as each component of the search acceptability filter 440). If any of the models is used by the system to analyze the text data and results in a confidence score above a certain threshold, the system may determine the question is appropriate (508:Yes) for question answering using an unstructured web search.

For example, the text data and/or features obtained from the text data (such as those obtained during step 506 by a feature component 404) may be sent from a speech processing component to the search manager 410. The text data and/or features may then be sent from the search answer controller 420 to the search acceptability filter 440. The search acceptability filter 440 may operate several components that check to see if the question is appropriate for answering using a search-based system. For example, a blacklist manager 442 may process the text data and/or features to search the text data for any words that are included which indicate the question is not suitable for search-based answering. Thus, in order for the question to be approved for unstructured search operations, the blacklist manager 442 may determine that the words of the text data do not include any words in a defined group of unapproved question words. If any such prohibited (i.e., blacklisted) words are found, the system may determine the question is not suitable (508:No) for search-based answering.

The search acceptability filter 440 may also include a question type manager 444 that may operate a machine learning model to classify what type the incoming query is. For example, the question type manager 444 may process the text data and/or features to determine if the query includes words such as who, what, when, where, to determine what kind of question is being asked and whether that type of question is suitable for search-based answering. In a particular embodiment, the system may focus on specific question words, such as "who" and "what" as those words may be particularly well suited for answering using the described search-based approach. The question type manager 444 may determine that the question type is in a defined group of approved question types. If the question is determined to not to be in a group of approved question types (e.g., the text data does not include the desired question words), or otherwise does not correspond to a question that will be well answered by a search-based, the system may determine the question is not suitable (508:No) for search-based answering.

The search acceptability filter 440 may also include a suitability manager 446 that may operate a machine learning model (such as a fast text classifier or other model) that may process the text data and/or other features to determine if the question (for example the form of the question) is suitable for search-based answering. The suitability manager 446 may also take as an input (either as part of the feature data or otherwise) a question type (such as a type determined by question type manager 444), question topic (such as a topic or subject determined by question classifier 448) or other data. The model/analysis used by the suitability manager 446 may be customized for the search-based answering enabled by the system. For example, in one particular embodiment the system may only be configured to be able to answer certain kinds of questions with reasonable accuracy. Thus the system may only determine such questions are suitable. Otherwise the system may determine the question is not suitable (508:No) for search-based answering.

The suitability manager 446 may output a score corresponding to how suitable the query text data is for answering using an unstructured web search. Such a score may correspond to how likely an unstructured web search (and potential further operations such as those of steps 146-152) is to obtain a correct answer to the question. The suitability manager 446 may be trained using training data including many example questions and whether a correct answer to those questions was obtained using an unstructured web search (and potential further operations such as those of steps 146-152). The score output by the suitability manager 446 at runtime may be a binary value (indicating a yes or no) or a numerical value, which may be compared to a threshold value to determine if the question is suitable for an unstructured search. The threshold value may be dynamic and/or configurable based on operating conditions of the system. For example, the threshold value may be increased if conditions suggest an unstructured search should not be done under existing circumstances or the threshold value may be decreased if an unstructured search is desired.

The search acceptability filter 440 may also include a question classifier 448 which may classifier the question based on the subject corresponding to the question. The question classifier 448 may use a customized machine learning model or may, for example, use a trained model that is generally used to categorize questions, such as one that may also be used to classify incoming queries that may be processed using the structured knowledge base 190. The question classifier 448 may process the text data and/or features to classify questions by topic (for example questions related to general facts, history, law, etc.). The question classifier 448 may determine that the question topic/subject is in a defined group of approved question topics/subjects. If the question does not correspond to a topic/subject that is well suited for search-based answering, the system may determine the question is not suitable (508:No) for search-based answering. In one particular embodiment the question classifier 448 may be configured to identify whether an incoming question is within a limited number of approved topics such as science, history, and/or geography. If the question is not within the limited number of approved topics, the system may determine the question is not suitable (508:No) for search-based answering. The search acceptability filter 440 may also include other components for considering question suitability.

If the question is suitable (508:Yes) the system may send (146) the text of the query to a search engine 480. The search engine 480 may search data source(s) 180 to determine one or more data sets that may be responsive to the query text data. The search engine 480 may then send URLs or other links to those data sets to the search manager 410, which receives (148) them. The search answer controller 420 may then obtain (150) data corresponding to those links and send that data to the search result manager 450. The search results manager may then determine (152) answer data from one of the top search results. For example, once the query is determined to be suitable, the search answer controller 420 which then sends a request to an API of the search engine 480 to run a search using the text data. The top certain number (for example 3) links corresponding to the search results get sent to the search answer controller 420. The links may point to one or more data source(s) 180. The search answer controller 420 may then use the links to access the data source(s) 180 (for example, Wikipedia pages, other web pages, data storage corresponding to a user device, etc.) and obtain the data linked thereto or, alternatively, to obtain the first few paragraphs or sentences of data that is indicated by the link(s). The search answer controller 420 and/or search result manager 450 may then isolate a portion of the answer data corresponding to a top search result. That portion may correspond, for example, to one or two sentences from a data source 180. The system may then determine (512) if the search result answer of the portion is appropriate as an answer to the original question. To do this the answer relevance classifier 460 may input the answer portion as well as the original query text data (and potentially other data such as feature data corresponding to the answer portion, original query text data, etc.) and may process those inputs using a machine learning model to determine a score as to whether the answer portion corresponds to the original question being asked. If yes (e.g., if the score is above a score threshold), the system may determine that the answer is responsive to the user's question (512:Yes).

If the answer portion is not responsive to the user's question (512:No), the system may again look through the search result data to find a different portion of answer data potentially responsive to the user's question until suitable answer data is found that satisfies the answer relevance classifier 460. If no such data is found, processing of the text data by the search manager 410 may be discontinued (510) and the text data may be sent or otherwise indicated for alternate processing.

If an answer portion is responsive to the user's question (512:Yes) the system may determine (522) a source indicator from the appropriate answer. For example, if the answer portion is taken from "Website X," text corresponding to Website X may be included in the source indicator. Turning again to FIG. 5B, if an answer is not found in the knowledge base (528:No) and an answer is found using the search-based approach, the system may combine (154) the appropriate search results answer data with the source indicator to create output data. The system may then perform (156) TTS on the output data to obtain output audio data and may send (536) the output audio data to a local device so the local device may output speech corresponding to the answer to the question. For example, the system may respond to the user's query with synthesized speech such as "I found an answer to your question. According to [website X]: [answer data]."

As noted above, the system (suing feature component 404) may determine (506) feature values corresponding to the question and may also configure a feature vector representing those values. The feature vector representing the question may then be used by the described models to determine (508) if the question is appropriate for answering during a web search, such as using components discussed above, such as those discussed in reference to FIG. 4. Feature values may include various data points representing characteristics of the text. Example features include words of the text, word embeddings for the words of the text, parts of speech tags for the words of the text, indicators for entities named in the text, or other features.

One feature that may be determined is any subject-verb-object (SVO) or subject-relation-object triples included in the particular text data. A triple is three expressions that give some sense of the syntactic structure of the text. Each expression may be a single word or multiple words. For example, a subject may have several words that identify the subject entity. Identifying a triple in a text segment may be performed using known semantic analysis techniques, such as those currently used to parse questions for querying a knowledge base. While a triple may not be enough to the entire semantic content of a text segment, the triple may impart some information that can be useful in identifying a text segment to answer a particular question. Any triple(s) identified for a particular text segment may be indicated in the feature data. One feature may include entity and relation mentions. Other features that may be included for a question are any keywords included in a text segment (e.g., the words of the text data). For example, words that may be useful in determining the subject of a text segment may be identified and indicated in feature data. Various known techniques for identifying keywords within a text segment may be used. Another feature that may be determined is information about the source of the question (such as the identity of a user submitting the question, a device from which the question originated, etc.). Other feature data may also be used.

The system may also include a formatter and/or formatter model that may be configured to operate on many different question types and may be particularly configured to output data in a voice-controlled system, where the eventual output to the user is known a priori to be synthesized speech. Thus the formatter may remove extraneous text from the text segment and make the answer more efficient and more pleasing for a user of a voice-controlled question answering system. The formatter and/or formatter model may attempt to create answer data with some syntactic similarity to the question and may even insert data not included in the text segment (such as the user's name or other information) to make the answer experience pleasing to the user.

Thus the present system offers a method for answering user questions in a voice-controlled environment, which improves upon existing web search technology, which simply returns a list of links unsuitable for voice-based exchanges. The present system is also more robust than a knowledge base system alone, as such systems are limited in the information they can provide. Although illustrated as being used with a voice-controlled question answering system, it may also be used with a non-voice controlled system.

Various machine learning techniques may be used to perform the training of the various classifiers and models discussed above. Models may be trained and operated according to various machine learning techniques. Such techniques may include, for example, neural networks (such as deep neural networks and/or recurrent neural networks), inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. As another example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text data as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training examples may be used to perform the training discussed herein.

Figure 7:
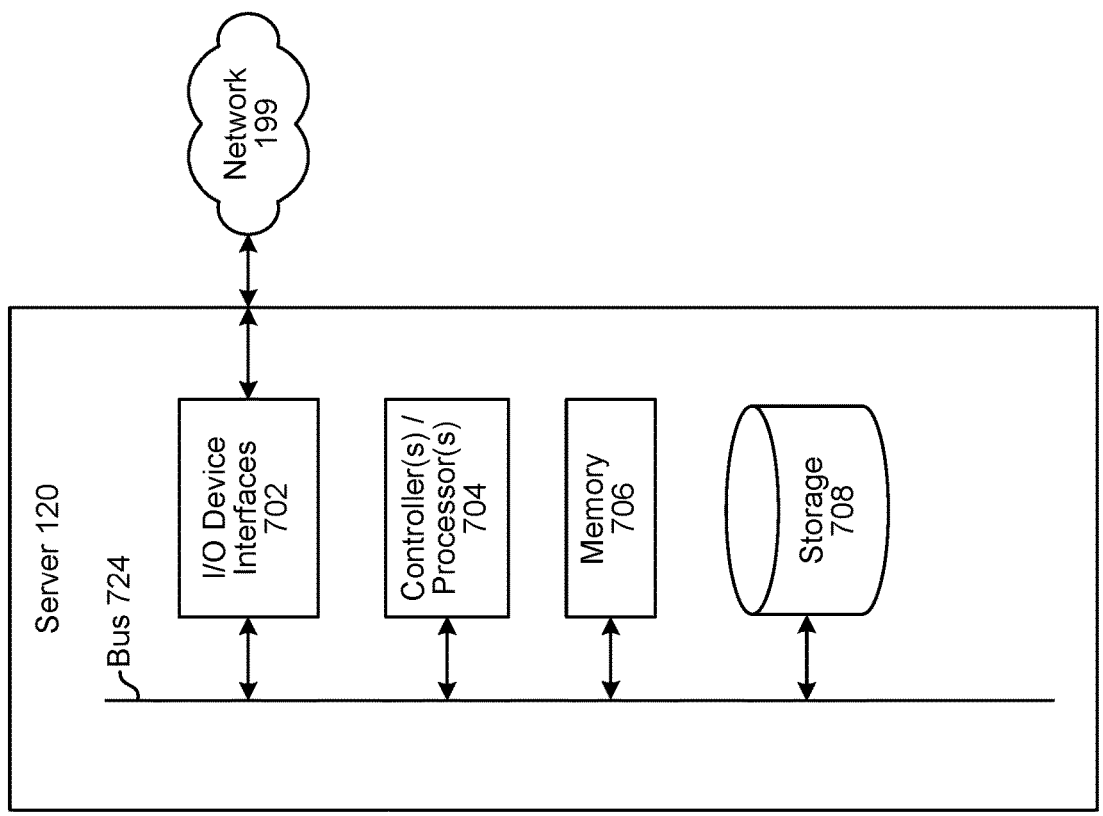
FIG. 7 is a block diagram conceptually illustrating example components of a server according to embodiments of the present disclosure.

FIG. 6 is a block diagram conceptually illustrating a local device 110 that may be used with the described system. FIG. 7 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (604/704), that may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive (MRAM) and/or other types of memory. Each device may also include a data storage component (608/708), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces, as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to the device 110 of FIG. 6, the device 110 may include a display 618, which may comprise a touch interface 619. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 602 that connect to a variety of components such as an audio output component such as a speaker 660, a wired headset or a wireless headset (not illustrated) or other component capable of outputting audio. The device 110 may also include an audio capture component. The audio capture component may be, for example, a microphone 650 or array of microphones, a wired headset or a wireless headset (not illustrated), etc. The microphone 650 may be configured to capture audio. If an array of microphones is included, approximate distance to a sound's point of origin may be performed acoustic localization based on time and amplitude differences between sounds captured by different microphones of the array. The device 110 (using microphone 650, wakeword detection module 220, ASR module 250, etc.) may be configured to determine audio data corresponding to detected audio data. The device 110 (using input/output device interfaces 602, antenna 614, etc.) may also be configured to transmit the audio data to server 120 for further processing or to process the data using internal components such as a wakeword detection module 220.

For example, via the antenna(s), the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprise the name entity recognition module 262, the intent classification module 264 and/or other components. The NLU module 260 may also include a stored knowledge base and/or entity library, or those storages may be separately located.

The device 110 and/or server 120 may also include an application 290 that is configured to execute commands/functions associated with a spoken command as described above.

The server 120 (and potentially the device 110 as well) may also include a TTS module 214 to process text into speech for use with the voice controlled interface or other features of the system 100.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 608 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 608 and compare the captured audio to the stored models and audio sequences using audio comparison, pattern recognition, keyword spotting, audio signature, and/or other audio processing techniques.

The server may include a model training component. The model training component may be used to train classifier(s)/models discussed above.

The server may also include a search manager component 410 that can operate to answer queries using the search-based methods disclosed here. The search manager component 410 may include a search answer controller 420, search acceptability filter 440, search result manager 450, answer relevance classifier 460 and storage which may store the machine trained model(s)/classifier(s) used to operate the present system, including but not limited to blacklist manager 442, question type manager 444, suitability manager 446, question classifier 448 and/or answer relevance classifier 460.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 6 and 7, are exemplary, and may be located a stand-alone device or may be included, in whole or in part, as a component of a larger device or system.

Figure 8:
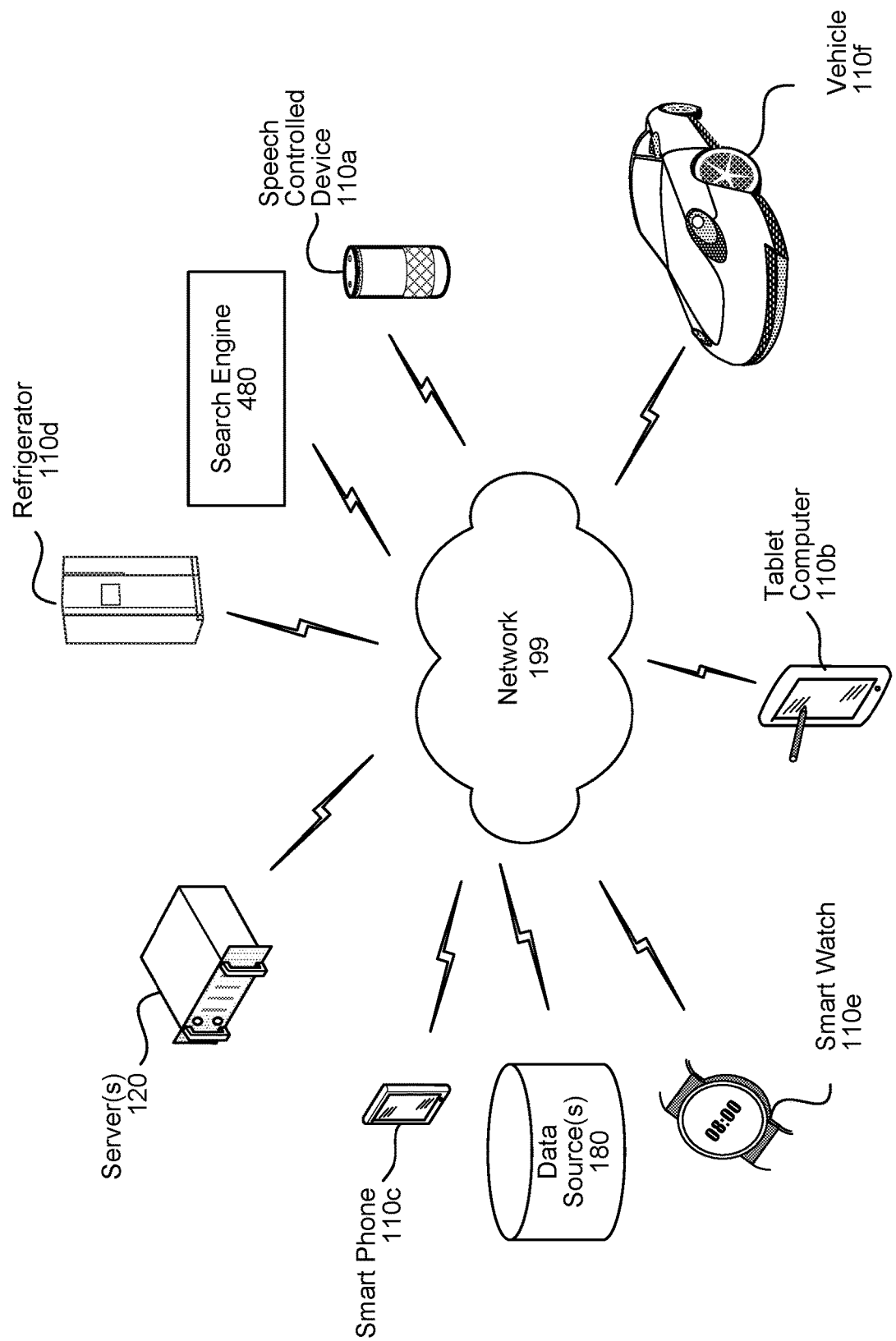
FIG. 8 illustrates an example of a computer network for use with the system.

As illustrated in FIG. 8 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 650 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving input audio data representing a question input to a question answering system;
   performing speech recognition on the input audio data to obtain first text data;
   determining feature data related to the question;
   sending at least a portion of the first text data to a search component;
   determining second text data corresponding to a plurality of search results;
   processing the feature data and the second text data using a first machine learning model to determine third text data represents an appropriate answer to the question;
   performing text-to-speech processing using at least a portion of the third text data to obtain output audio data; and
   sending the output audio data to a device.

2. The computer-implemented method of claim 1, further comprising:
   performing natural language understanding (NLU) on the first text data to determine NLU result data,
   wherein the feature data comprises the NLU result data.

3. The computer-implemented method of claim 1, further comprising:
   selecting a portion of the second text data to include in the third text data.

4. The computer-implemented method of claim 1, further comprising:
   receiving a plurality of links corresponding to the plurality of search results,
   wherein:
       determining the second text data comprises:
           using a first link of the plurality of links to obtain first potential answer text data from a first web source, and
           using a second link of the plurality of links to obtain second potential answer text data from a second web source; and
       the second text data includes at least the first potential answer text data and the second potential answer text data; and
   the method further comprises selecting a portion of the first potential answer text data as the third text data.

5. The computer-implemented method of claim 4, wherein: processing the feature data and the second text data using a first machine learning model comprises:
   determining a first score corresponding to the first potential answer text data,
   determining a second score corresponding to the second potential answer text data; and
   the method further comprises determining the first score corresponds to an appropriate answer to the question.

6. The computer-implemented method of claim 4, further comprising:
   determining indicator text corresponding to the first web source,
   wherein performing the text-to-speech processing further uses the indicator text to obtain the output audio data that includes a representation of the first web source.

7. The computer-implemented method of claim 4, wherein using the first link of the plurality of links to obtain the first potential answer text data comprises:
   using the first link to obtain fourth text data from the first web source, the fourth text data including a first portion and a second portion;
   determining that the second portion does not correspond to an answer to the question; and
   selecting the first portion as the first potential answer text data.

8. The computer-implemented method of claim 1, wherein determining the feature data comprises including at least a portion of the first text data in the feature data.

9. The computer-implemented method of claim 1, further comprising:
determining syntactic information corresponding to the question; and
selecting fourth text data based at least in part on the syntactic information,
wherein performing the text-to-speech processing further uses the fourth text data.

10. The computer-implemented method of claim 1, further comprising:
processing the feature data using at least one second trained machine learning model to determine that the question is suitable for answering using an unstructured web search.

11. A system comprising:
at least one processor; and
memory including instructions operable to be executed by the at least one processor to configure the system to:
receive input audio data representing a question input to a question answering system;
perform speech recognition on the input audio data to obtain first text data;
determine feature data related to the question;
send at least a portion of the first text data to a search component;
determine second text data corresponding to a plurality of search results;
process the feature data and the second text data using a first machine learning model to determine third text data represents an appropriate answer to the question;
perform text-to-speech processing using at least a portion of the third text data to obtain output audio data; and
send the output audio data to a device.

12. The system of claim 11, wherein the memory further includes instructions that are operable to be executed by the at least one processor to further configure the system to:
perform natural language understanding (NLU) on the first text data to determine NLU result data,
wherein the feature data comprises the NLU result data.

13. The system of claim 11, wherein the memory further includes instructions that are operable to be executed by the at least one processor to further configure the system to:
select a portion of the second text data as the third text data.

14. The system of claim 11, wherein the memory further includes instructions that are operable to be executed by the at least one processor to further configure the system to:
receive a plurality of links corresponding to the plurality of search results,
wherein:
the instructions that are operable to be executed by the at least one processor to configure the system to determine the second text data comprise instructions that are operable to be executed by the at least one process to configure the system to:
use a first link of the plurality of links to obtain first potential answer text data from a first web source, and
use a second link of the plurality of links to obtain second potential answer text data from a second web source; and
the second text data includes at least the first potential answer text data and the second potential answer text data; and the memory further includes instructions that are operable to be executed by the at least one processor to further configure the system to select a portion of the first potential answer text data as the third text data.

15. The system of claim 14, wherein the instructions that are operable to be executed by the at least one processor to configure the system to process the feature data and the second text data using a first machine learning model comprise instructions that are operable to be executed by the at least one processor to configure the system to:
determine a first score corresponding to the first potential answer text data;
determine a second score corresponding to the second potential answer text data; and
the memory further includes instructions that are operable to be executed by the at least one processor to further configure the system to determine the first score corresponds to an appropriate answer to the question.

16. The system of claim 14, wherein the memory further includes instructions that are operable to be executed by the at least one processor to further configure the system to:
determine indicator text corresponding to the first web source,
wherein the instructions that are operable to be executed by the at least one processor to configure the system to perform the text-to-speech processing further uses the indicator text to obtain output audio data that includes a representation of the first web source.

17. The system of claim 14, wherein the instructions that are operable to be executed by the at least one processor to configure the system to use the first link of the plurality of links to obtain the first potential answer text data comprise instructions that are operable to be executed by the at least one processor to configure the system to:
use the first link to obtain fourth text data from the first web source, the fourth text data including a first portion and a second portion;
determine that the second portion does not correspond to an answer to the question; and
select the first portion as the first potential answer text data.

18. The system of claim 14, wherein the instructions that are operable to be executed by the at least one processor to configure the system to determine the feature data comprise instructions that are operable to be executed by the at least one processor to configure the system to include at least a portion of the first text data in the feature data.

19. The system of claim 11, wherein the memory further includes instructions that are operable to be executed by the at least one processor to further configure the system to:
determine syntactic information corresponding to the question;
select fourth text data based at least in part on the syntactic information,
wherein the instructions that are operable to be executed by the at least one processor to configure the system to perform the text-to-speech processing further uses the fourth text data.

20. The system of claim 11, wherein the memory further includes instructions that are operable to be executed by the at least one processor to further configure the system to:
process the feature data using at least one second trained machine learning model to determine that the question is suitable for answering using an unstructured web search.

* * * * *